United States Patent
Glass

(10) Patent No.: US 6,835,027 B1
(45) Date of Patent: Dec. 28, 2004

(54) STAPLE FOR SECURING GEO-TEXTILE MATERIAL TO THE GROUND

(76) Inventor: Billy Glass, 9300 Timothy Dr., Reno, NV (US) 89511

( * ) Notice: Subject to any disclaimer, the term of this patent is extended or adjusted under 35 U.S.C. 154(b) by 0 days.

(21) Appl. No.: 10/702,532

(22) Filed: Nov. 5, 2003

(51) Int. Cl.[7] .......................... E02D 17/20; F16B 15/00
(52) U.S. Cl. .............................. 405/302.7; 256/DIG. 3; 411/444; 405/302.4; 405/303
(58) Field of Search ................... 411/444; 256/DIG. 3; 405/15–17, 19, 302.4, 302.7, 303

(56) References Cited

U.S. PATENT DOCUMENTS

| | | | |
|---|---|---|---|
| 360,225 A | * 3/1887 | Kanters | 405/19 |
| 450,246 A | * 4/1891 | Ludlow | 411/444 |
| 3,934,421 A | 1/1976 | Daimler et al. | 405/16 |
| 4,090,337 A | 5/1978 | Szekeres | 52/309.1 |
| 4,472,086 A | 9/1984 | Leach | 405/302.7 |
| 4,486,121 A | * 12/1984 | Thompson et al. | 405/17 |
| 4,572,705 A | * 2/1986 | Vignon et al. | 405/16 |
| 5,137,112 A | * 8/1992 | Nichols | 182/3 |
| 5,428,935 A | 7/1995 | Mitchell | 52/698 |
| 5,429,450 A | 7/1995 | Meidinger | 405/15 |
| 5,720,579 A | 2/1998 | Trangsrud | 405/244 |
| 6,171,022 B1 | 1/2001 | Decker | 405/16 |
| 6,216,389 B1 | 4/2001 | Motz et al. | 47/58.1 R |
| D445,710 S | 7/2001 | Lewis | D10/109 |
| 6,299,379 B1 | 10/2001 | Lewis | 404/9 |

OTHER PUBLICATIONS

Machining Automation Website, "Innovative Gardner Bender Colorcode™ Plastic and Insulated Metal Staples Simplify Fastene Selection," Jun. 2003, Thomas Publishing Company.*

* cited by examiner

Primary Examiner—Thomas B. Will
Assistant Examiner—Tara L. Mayo
(74) Attorney, Agent, or Firm—Carter, Schnedler & Monteith

(57) ABSTRACT

There is provided a device for securing geo-textile material in place on the ground in the form of a fastener having a top member and at least one elongated leg member. The leg member is driven into the ground in close proximity to the geo-textile material. The top member remains above the ground with at least a portion of the top member being of a color which contrasts with the color of the geo-textile material so that the location of the fastener may be readily determined. Thus, an inspector will know whether or not the geo-textile material has been properly secured to the ground.

28 Claims, 2 Drawing Sheets

US 6,835,027 B1

STAPLE FOR SECURING GEO-TEXTILE MATERIAL TO THE GROUND

BACKGROUND OF THE INVENTION

This invention relates to geo-textile installation systems. As used herein, "geo-textile material" includes geo-textile mats, erosion control mats, ground stabilization materials, turf reinforcement mats, artificial turf and sod. More particularly, it relates to geo-textile material which is stapled to the ground. Geo-textile material has been used for many years, especially for ground stabilization. Geo-textile material comes in many forms.

Often, one of the more common forms of geo-textile material is a mat consisting of crisscross filaments of nylon which are welded together at their intersections forming open windows or loops. One such mat is described in U.S. Pat. No. 3,934,421. Often the nylon filaments are a dark color, such as black.

Another geo-textile material is the Landlok® Erosion Control Blanket sold by Si Geosolutions of Chattanooga, Tenn. The Landlok® Blanket includes fiber material which is sandwiched between two (2) layers of connected nylon filaments. The fiberous material for the Landlok® Erosion Control Blanket is brown in color, while the nylon filaments are black. Often the color of the geo-textile mat is picked to mimic the natural color of the ground so that the mat will blend in with its surrounding, thus rendering the ground treatment project aesthetically pleasing.

In order to secure the geo-textile mat to the ground, particularly on sloped ground, elongated staples are utilized. The staples are driven through the mat and into the ground. The staples are normally grey or black in color and tend to blend in with the color of the ground and the mat.

Many ground stabilization projects are done by private contractors under a contract with a government entity such as a state Department of Transportation. After a geo-textile mat has been put in place and secured to the ground by staples, an inspector, such as a DOT inspector, will view the site to make sure that the mat has been properly installed, including the proper placement and quantity of staples. Since only the top portion of the staples are above-ground after installation and since the color of the staples tends to blend with the color of the ground and the mat, it is very difficult for an inspector to visually observe the location and placement of the staples. This results in substantial inefficiencies and frustrations and can result in a ground stabilization project passing inspection when, in fact, it should not.

SUMMARY OF THE INVENTION

In accordance with one form of this invention, there is provided a device for securing geo-textile material in place on the ground. The device is in the form of a fastener. The fastener includes a top member and at least one elongated leg member. The top member is connected to the elongated leg member. The elongated leg member is adapted to be driven into the ground in close proximity to the geo-textile material. At least a portion of the top member is adapted to remain above the ground when the leg member is in the ground. At least a portion of the top member is of a color which contrasts with the color of the geo-textile material so that the location of the fastener may be readily determined.

In accordance with another form of this invention, there is provided the combination of geo-textile material and a device for securing geo-textile material in place on the ground. A mesh is provided which includes a plurality of interconnected filaments adapted to be placed on the ground. A plurality of fasteners is provided. Each fastener, which interfaces with at least one filament, includes a top member and at least one elongated leg member. The top member is connected to the elongated leg member. The elongated leg member is adapted to be driven into the ground in close proximity to said at least one filament of the geo-textile material. At least a portion of the top member is adapted to remain above the ground when the leg member is in the ground. At least a portion of the top member is of a color which contrasts with the color of the geo-textile material so that the location of the fastener may be readily determined.

It is preferred that the fastener be in the form of a staple having a top member and a pair of elongated leg members. It is also preferred that the color of the portion of the top member be a bright color. It is also preferred that the color contrast with the color of the ground.

BRIEF DESCRIPTION OF THE DRAWINGS

The subject matter which is regarded as the invention is set forth in the appended claims. The invention, however, can be better understood taken in conjunction with the accompanying drawings in which:

DESCRIPTION OF THE PREFERRED EMBODIMENT

Figure 1:
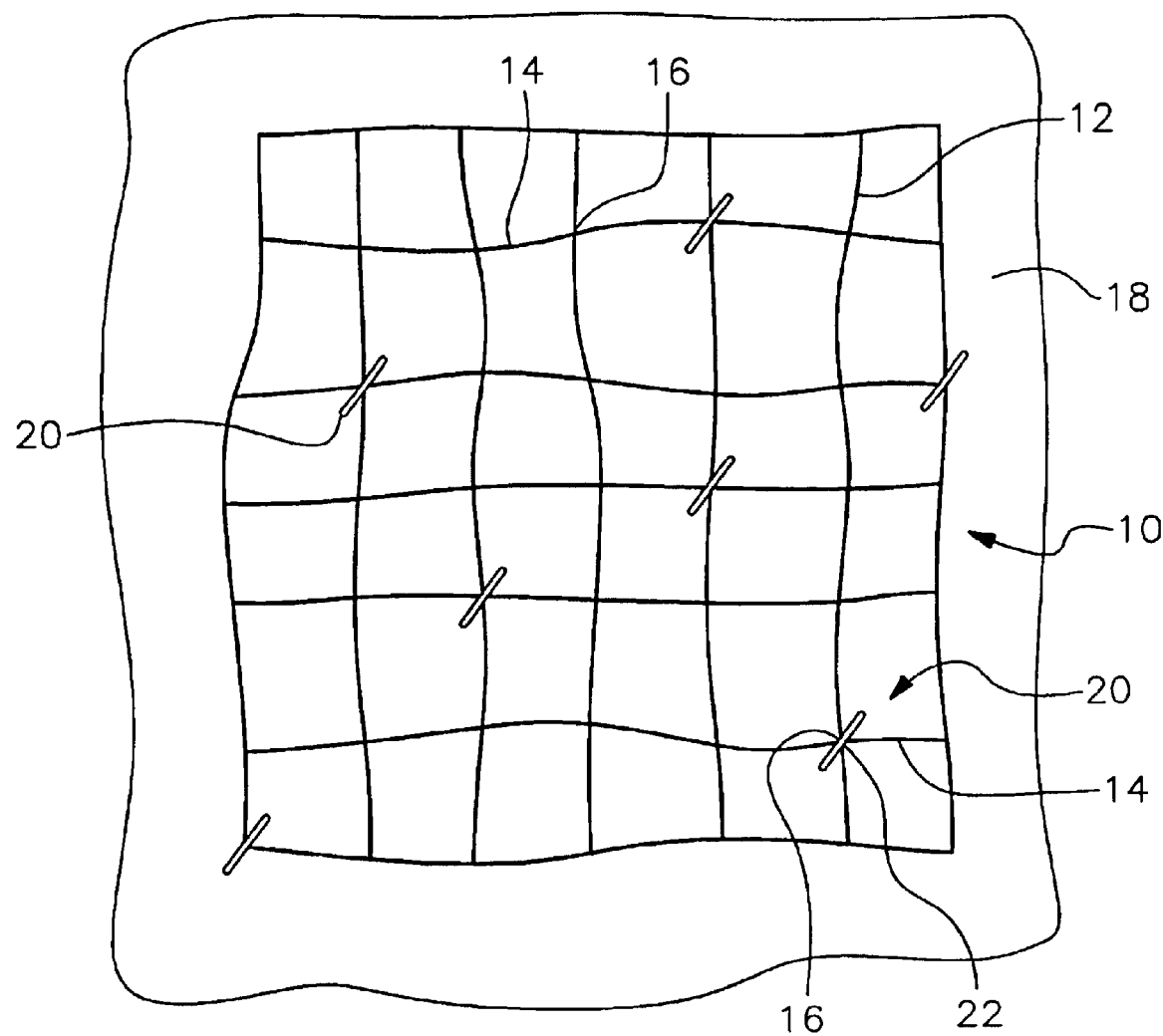
FIG. 1 is a plan view illustrating geo-textile material secured to the ground by the staples of the subject invention.

Referring now more particularly to FIG. 1, there is provided geo-textile material 10, which is one embodiment in the form of a plurality of spaced apart nylon filaments 12 extending in one direction and a plurality of spaced apart nylon filaments 14 extending in a direction substantially perpendicular to the direction of the nylon filaments 12. The intersections 16 of the nylon filaments are connected together by means of heat welding which melts the nylon forming interstices. Other forms of geo-textile material may be utilized, including two layers of the filaments shown in FIG. 1 having random fibers sandwiched therebetween. The words "geo-textile material" are to be construed broadly as defined in the Background of the Invention. Geo-textile material 10 is held in place on the ground 18 by means of a plurality of staples 20. When used herein, the word "ground" is to be construed broadly as including earth, leaves, small rocks and other material normally associated with the ground. Normally, the geo-textile material 10 is a color which is similar to the color of the ground so that it will blend in with the ground.

Figure 2:
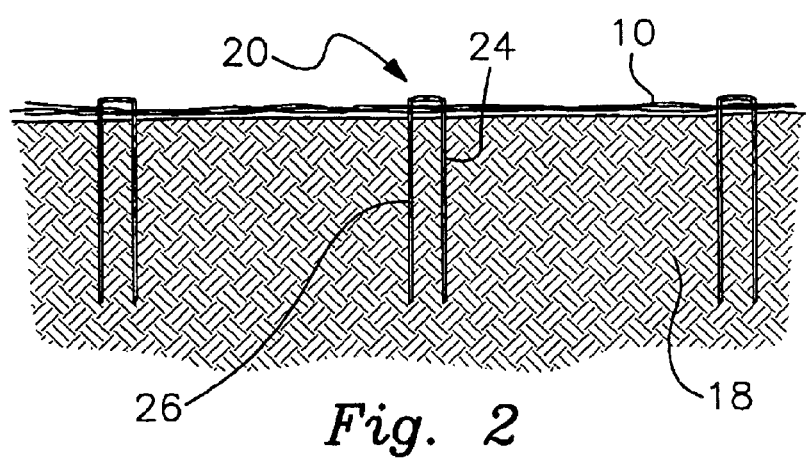
FIG. 2 is a sectional view showing a portion of the staples, the geo-textile material, and the ground shown in FIG. 1.
Figure 3:
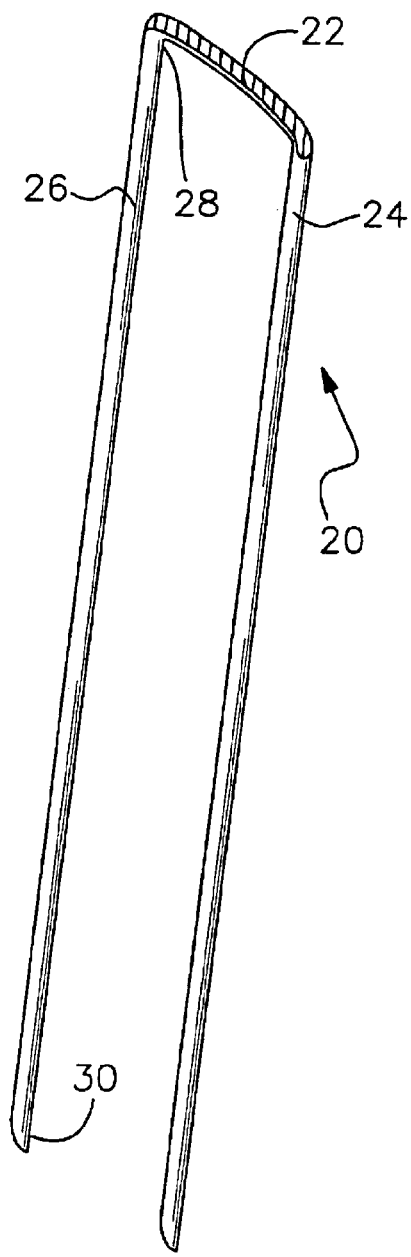
FIG. 3 is a perspective view showing a staple of the present invention.
Figure 4:
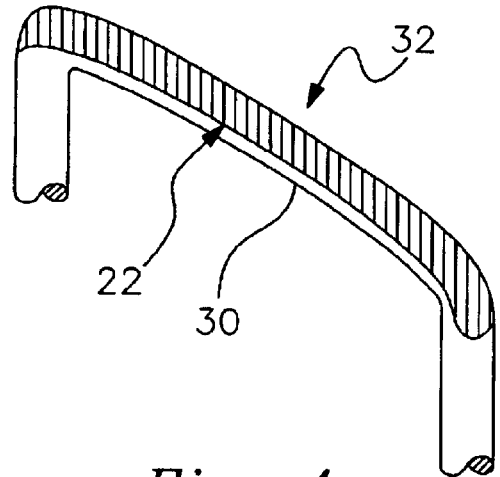
FIG. 4 is a more detailed view primarily showing the top member of the staple of FIG. 3.
Figure 5:
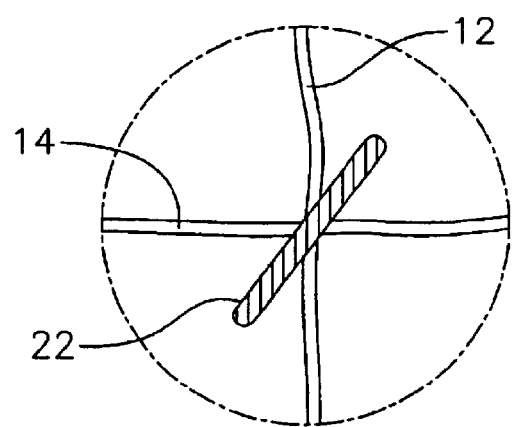
FIG. 5 is a more detailed view showing one connection between the staple of the subject invention and the intersecting filaments of the geo-textile material shown in FIG. 1.

As better seen in reference to FIG. 3, a staple 20 includes top member 22 and at least on elongated leg member and preferably first and second elongated leg members 24 and 26. Each leg member includes first end 28 which is integrally connected to top member 22 and a second end 30 which is a free end and which is pointed so that the staple 20 can be readily driven into the ground. The relationship between the staple 20, the geo-textile material 10 and the ground 18 is better seen in reference to FIG. 2. The legs 24 and 26 of staple 20 are located within the ground 18 and portions thereof are in close proximity to geo-textile material 10, in particular to a filament.

As shown in FIG. 1, top member 22 of staple 20 extends across the interstice 16 formed by the intersection of nylon filaments 12 and 14 and the bottom 30 of top member 22 of staple 20 makes contact with filaments 12 and/or 14 so as to secure the geo-textile material in place on the ground 18.

As shown in FIGS. 1 and 2, the top member 22 of staple 20 remains above the ground 18 after the staple has been driven into the ground. At least the upper portion 32 of top member 22 has been colored with a color which preferably contrasts with the color of the geo-textile material 10 and also preferably contrasts with the color of the ground so that the location of staple 20 is readily ascertainable. In the embodiment shown herein, the color is red. However, other colors will suffice so as long as one is able to determine the location of the staple after it has been driven into the ground. Thus, it is preferred that the color be a bright or vivid color. In addition, the color may be made from a luminescent material such as luminescent paint so that it is more visible in dim light. It is also preferred, for the sake of simplicity, that the color simply be painted on the top member 22, although the color may be applied by other means known to those skilled in the art, such as inking or dying.

While the Invention has been described in terms of the above embodiments, those skilled in the art will recognize that the invention can be practiced with modification within the spirit and scope of the appended claims.

What is claimed is:

1. A combination of geo-textile material and a device for securing geo-textile material in place on the ground comprising:
    geotextile material; a fastener; said fastener including a top member and at least one elongated leg member; said top member connected to said elongated leg member; said elongated leg member adapted to be driven into the ground through said geo-textile material; at least a portion of said top member adapted to remain above the ground when said leg member is in the ground; and
    at least a portion of said top member being of a vivid color which contrasts with the color of the geo-textile material so that the location of the fastener may be readily determined.

2. A combination as set forth in claim 1 wherein said top member has first and second ends; said at least one elongated leg member including first and second elongated leg members; said first elongated leg member attached to said first end of said top member; said second elongated leg member attached to said second end of said top member.

3. A combination as set forth in claim 1 wherein said at least one elongated leg member includes a pair of elongated leg members; said fastener being in the shape of a staple.

4. A combination as set forth in claim 1 wherein said color is a bright color.

5. A combination as set forth in claim 4 wherein said color is luminescent.

6. A combination as set forth in claim 1 wherein said color is painted on said top member.

7. A combination as set forth in claim 1 wherein said color is formed by an ink.

8. A combination as set forth in claim 1 wherein said color is formed by a dye.

9. A combination as set forth in claim 1 wherein said elongated leg member has first and second ends; said first end connected to said top member; said second end being pointed so that said elongated leg member may be readily driven into the ground.

10. A combination as set forth in claim 1 wherein said color contrasts with the color of the ground.

11. A combination as set forth in claim 1 wherein said top member is adopted to contact said geo-textile material when said elongated leg member is driven into the ground.

12. A combination as set forth in claim 1 wherein said top member has an upwardly facing side and a downwardly facing side; said color being on said upwardly facing side.

13. A combination as set forth in claim 12 wherein said color contrasts with the color of the ground.

14. The combination of geo-textile material and a device for securing geo-textile material in place on the ground comprising:
    a mesh, including a plurality of interconnected filaments adapted to be placed on the ground;
    a plurality of fasteners; each of said fasteners interfaces with at least one filament; each of said fasteners including a top member and at least one elongated leg member; said top member connected to said elongated leg member; said elongated leg member adapted to be driven into the ground between adjacent filaments of said mesh; at least a portion of said top member adapted to remain above the ground when said leg member is in the ground; and
    at least a portion of said top member being of a vivid color which contrasts with the color of said mesh so that the location of each of said fasteners may be readily determined.

15. A combination as set forth in claim 14 wherein said top member has first and second ends; said at least one elongated leg member including first and second elongated leg members; said first elongated leg member attached to said first end of said top member, said second elongated leg member attached to said second end of said top member.

16. A combination as set forth in claim 14 wherein said at least one elongated leg member includes a pair of elongated leg members; said fastener being in the shape of a staple.

17. A combination as set forth in claim 14 wherein said color is a bright color.

18. A combination as set forth in claim 17 wherein said color is luminescent.

19. A combination as set forth in claim 14 wherein said color is painted on to said top member.

20. A combination as set forth in claim 14 wherein said color is formed by an ink.

21. A combination as set forth in claim 14 wherein said color is formed by a dye.

22. A combination as set forth in claim 14 wherein said elongated leg member has first and second ends; said first end connected to said top member; said second end being pointed so that said elongated leg member may be readily driven into the ground.

23. A combination as set forth in claim 14 wherein said color contrasts with the color of the ground.

24. A combination as set forth in claim 14 wherein at least a portion of said top member is adapted to contact said geotextile material when said elongated leg member is driven into the ground.

25. A combination as set forth in claim 14 wherein said top member has an upwardly facing side and a downwardly facing side; said color being on said upwardly facing side.

26. A combination as set forth in claim 25 wherein said color contrasts with the color of the ground.

27. A combination of geo-textile material and device for securing geo-textile material in place on the ground comprising:

geo-textile material a fastener; said fastener including a top member and at least one elongated leg member; said top member connected to said elongated leg member; said elongated leg member adapted to be driven into the ground through said geo-textile material; at least a portion of said top member adapted to remain above the ground when said elongated leg member is in the ground; and at least a portion of said top member being of a vivid color as to enable an observer to readily locate the fastener when said leg member is in the ground.

28. A combination as set forth in claim 27 wherein said at least one elongated leg member includes first and second leg members; said fasteners being in the form of a staple.

* * * * *